United States Patent [19]

Ryham

[11] Patent Number: 4,877,080

[45] Date of Patent: Oct. 31, 1989

[54] PROCESS AND APPARATUS FOR COOLING A FLUID

[75] Inventor: Rolf Ryham, Princeton, N.J.

[73] Assignee: Ahlströmföretagen Svenska AB, Norrköping, Sweden

[21] Appl. No.: 206,036

[22] Filed: Jun. 13, 1988

[51] Int. Cl.⁴ .................. B41C 3/02; B22D 19/00; F25B 15/00

[52] U.S. Cl. .................. 165/2; 165/111; 62/476; 62/481

[58] Field of Search .................. 165/111, 2, 65, 58, 165/130, 900, 911; 62/476, 481, 482

[56] References Cited

U.S. PATENT DOCUMENTS

| | | | |
|---|---|---|---|
| 4,520,634 | 6/1985 | Oouchi et al. | 62/476 |
| 4,573,330 | 3/1986 | Vander Sluys et al. | 62/476 |
| 4,593,531 | 6/1986 | Fujimoto | 62/476 X |

Primary Examiner—Larry Jones
Attorney, Agent, or Firm—Cohen, Pontani & Lieberman

[57] ABSTRACT

A cooling process and apparatus which utilizes the lower water vapor pressure above a fluid such as water-salt solutions of, for example, calcium chloride, lithium chloride, lithium bromide or mixtures thereof. Heat is then removed from the fluid by indirect contact with a circulating water stream in a heat exchanger. Water which has taken up heat from the fluid is expanded at reduced pressure to release water vapor and lower the temperature of the water. The water vapor is then absorbed in a salt solution having a higher temperature but a lower water vapor pressure than that of the released water vapor. The remaining water is recirculated to the heat exchanger.

16 Claims, 1 Drawing Sheet

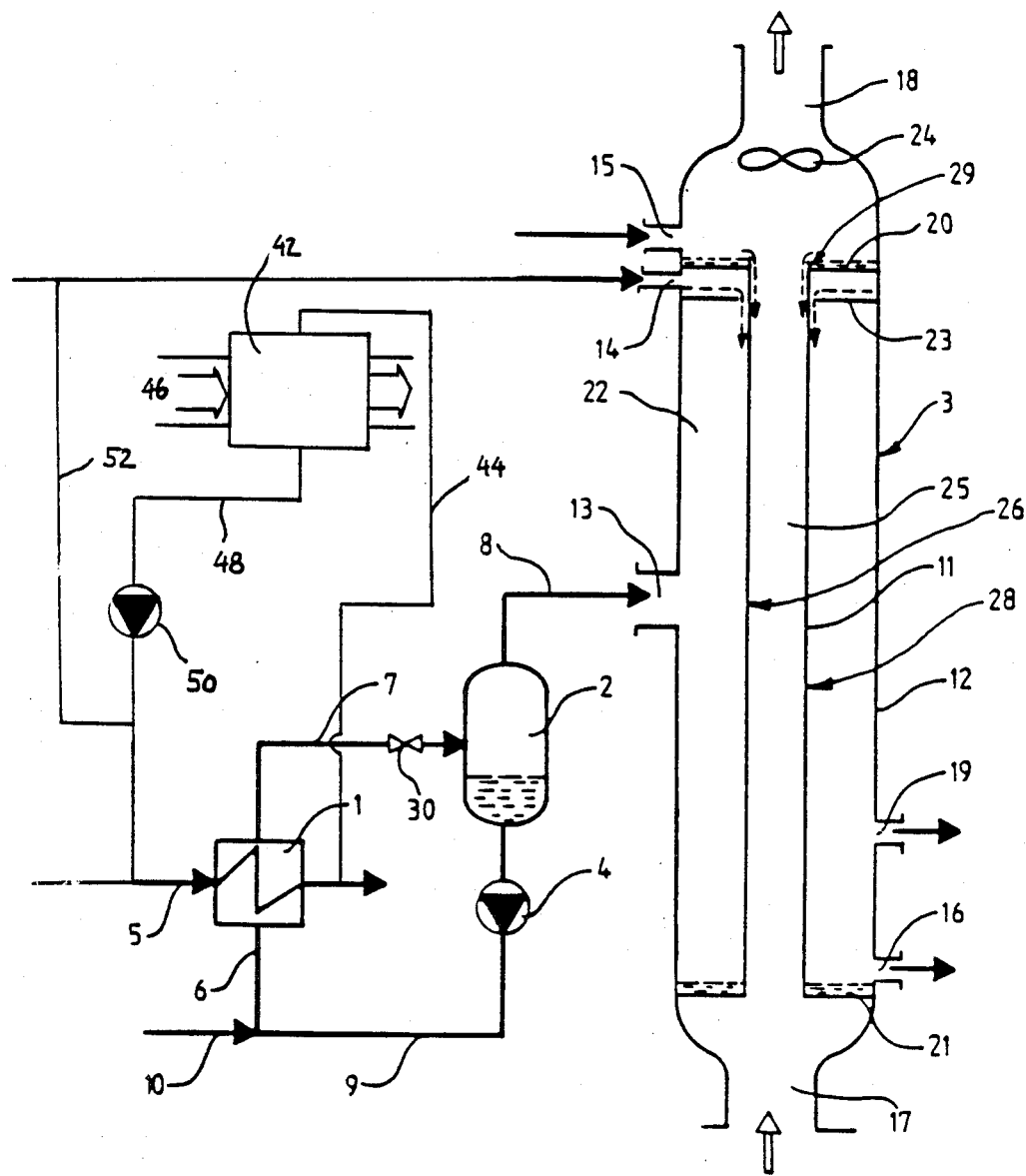

PROCESS AND APPARATUS FOR COOLING A FLUID

FIELD OF THE INVENTION

The present invention relates to a cooling process and an apparatus therefor and particularly to an air conditioning apparatus and process for cooling a liquid which removes moisture and/or heat from the air.

BACKGROUND AND SUMMARY OF THE INVENTION

It is known that the water vapor pressure above concentrated water-salt solutions of, for example, calcium chloride, lithium chloride or lithium bromide or the like and/or mixtures thereof is lower than that of pure water at corresponding temperature, and that these solutions can be therefor used as water-absorption liquids.

According to one aspect of the present invention a circulating water stream which takes up and carries away heat from a heat exchanger is caused to expand at reduced pressure in a flash tank. An amount of water vapor corresponding to the temperature drop, i.e. the absolute pressure, is then released. The water vapor released by expansion in the flash tank is introduced into a condenser having cooled surfaces which are continuously wetted by a water-absorbing concentrated salt solution. Water vapor is absorbed by the salt solution or condensed into it as long as the water vapor pressure above the salt solution is lower than the pressure of the vapor released by the expansion from the flash tank. It is thus possible to condense water vapor in a salt solution having a temperature which is about 20° C. or more above the saturation temperature of the water vapor.

The present invention thus utilizes the low water vapor pressure above a concentrated salt solution for allowing a saturated water vapor to be absorbed in a salt solution having a higher temperature than the absorbed water vapor.

It is another object of the present invention to provide a method and apparatus for cooling a fluid such as, for example, an absorption liquid used to dehumidify and cool a gas such as air in an air conditioning apparatus.

BRIEF DESCRIPTION OF THE DRAWING

The following detailed description of a preferred embodiment of the present invention is given with reference to the accompanying drawing which shows a schematic view of a cooling system in accordance with the present invention.

DISCLOSURE OF THE PRESENTLY PREFERRED EMBODIMENT

As shown in the drawing the cooling system comprises a heat exchanger 1, a flash tank 2, a condenser 3, and a pump 4. A fluid flowing through conduit 5 is cooled in heat exchanger 1 by indirect contact with a circulating water stream which is absorbing heat from the fluid. The fluid could, for example, be an absorption liquid such as a concentrated salt solution which is cooled in heat exchanger 1 and then fed to absorber 42 through conduit 44 absorbing moisture from a stream of air 46 in an air conditioner of the direct contact absorption type. The water is introduced into the heat exchanger through conduit 6 and is discharged therefrom through conduit 7. The heated water discharged from the heat exchanger is passed through a pressure control device such as restriction valve 30 to flash tank 2 in which the pressure is sufficiently low to cause the release of water vapor therefrom. Evaporation of water requires heat which is removed from the water thus causing the temperature thereof to decrease. An amount of vapor corresponding to the temperature drop of the water is released. The vapor is thereafter discharged from flash tank 2 and passed to condenser 3 through conduit 8. The water remaining in the flash tank is recirculated to heat exchanger 1 preferably by a pump 4 through conduit 9. As water is continuously consumed by the evaporation, additional water is supplied through conduit 10 as needed. The cooled absorption liquid is fed through conduit 44 to absorber 42 wherein it will absorb moisture from a stream of air 46 and cool the same. The absorption liquid is returned to heat exchanger 1 through conduit 48 by pump 50. At least a portion of the absorption liquid may be fed into condenser 3 via conduit 52.

Condenser 3 comprises a preferably vertically oriented preferably tubular heat exchange element 11 having an inner surface 26, and an outer surface 28 which is enclosed by a preferably coaxial casing 12. Annular plates 20 and 21 are disposed between the vertical wall of the casing and the outer surface 28 of the heat exchange element 11 at the upper and lower ends thereof to form an enclosed annular space 22 surrounding heat exchange element 11. Casing 12 is provided with an inlet 13 permitting the vapor to be condensed to enter enclosed space 22. Inlet 14 is provided preferably below and in the close vicinity of upper plate 20 to permit the introduction of absorption liquid into enclosed space 22. Inlet 15 is provided within casing 12 above upper plate 20 for allowing the introduction of cooling liquid. Outlet 16, preferably located at or close to the bottom of enclosed space 22 permits the withdrawal of absorption liquid diluted by condensate from the water vapor absorbed therein. Outlet 19 located in casing 12 above outlet 16 is in communication with enclosed space 22 and permits the removal of uncondensed gases therefrom. A vacuum pump (not shown) may be connected to outlet 19.

Casing 12 is further provided with air inlet 17 and air outlet 18 preferably at the lower and upper end thereof, respectively. Impeller 24 assists the motion of air through the condenser 3 along inner surface 26 of heat exchange element 11.

The upper end of tubular heat exchange element 11 extends beyond upper plate 20 so as to form an annular protrusion 29 to assist the overflow of the cooling liquid supplied through inlet 15 to flow down along the inner surface 26 of heat exchange element 11 in form of a preferably uniformly thin liquid film.

Annular plate 23 is positioned preferably in close vicinity below upper annular plate 20 and extends from the wall of casing 12 substantially horizontally towards the outer surface 28 of heat exchange element 11 thus forming a circular opening around the outer surface 28 of heat exchange element 11 so that the absorption liquid introduced through inlet 14 into closed space 22 is caused to flow down along the outer surface 28 of heat exchange element 11 in form of a preferably uniform thin film. Casing 12 is thus provided with inlet 13 for water vapor, with inlet 14 for the absorption liquid, with inlet 15 for the cooling liquid, with outlet 16 for absorption liquid diluted by condensate (water vapor) and air inlet 17 and air outlet 18. An outlet 19 is provided for the removal of uncondensed gases. A vacuum pump (not shown) may be connected to the outlet 19.

The water vapor released in flash tank 2 by expansion is transferred through conduit 8 to inlet 13. Flash tank 2 and conduit 8 communicate with the enclosed space 22 around the outer surface 28 of heat exchange element 11. By introducing the water vapor into enclosed space 22 the water vapor is brought into contact with the absorption liquid supplied through one or more inlets 14 and flowing down along outer surface 28 of heat exchange element 11.

The inside 26 of heat exchange element 11 is cooled by a cooling liquid such as water supplied through one or more inlets 15 and flowing down preferably uniformly along the inner surface of the heat exchange element. The air stream which preferably flows countercurrent to the water in the heat exchange element cools the water by evaporation. The evaporated water is removed along with the air through outlet 18.

The water vapor supplied to the condenser 3 through inlet 13 condenses on the outside surface 28 of the heat exchange element and is removed therefrom as condensate along with the absorption liquid through outlet 16. As long as the temperature of the absorption liquid and its concentration are such that the water vapor pressure above the liquid is lower than that of the water vapor the water vapor will be absorbed by the absorption liquid.

The heat released by condensation of the water vapor will be taken up by the water flowing down on the inner surface 26 of the heat exchange element 11 and will be transferred to the air flowing through it.

EXAMPLE

A liquid, for example, an absorption liquid which is used to remove moisture and cool air in an air conditioning system is cooled in a cooling system according to the present invention. In heat exchanger 1 the liquid is cooled from 35° C. to 18° C. by indirect heat exchange with water which thereby is warmed from 15° C. to 25° C. The water is then expanded to a pressure corresponding to a boiling point of 15° C. The released water vapor is condensed and absorbed in a concentrated salt solution having a temperature of 35° C. Air, having a temperature of 30° C. and which evaporates water supplied to the inner surface 26, is drawn through the heat exchange element 11. A diluted salt solution having a temperature of 55° C. is removed from outlet 16.

The absorption liquid which has been diluted by absorption of water vapor may thereafter be regenerated by evaporation for reuse in a manner known per se.

In the embodiment shown the condenser 3 comprises only one tubular heat exchange element 11 but is clear that a plurality of heat exchange elements can be used which may be of the tube-type or the plate-type. The inside of the heat exchange element may be cooled by a liquid or as described above by a liquid and a gas.

Thus, while the invention has been herein shown and described on what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalence structures and methods.

What is claimed is:

1. A process for cooling a fluid comprising the steps of:
   removing heat from a fluid by indirect contact with a liquid in a first heat exchanger;
   expanding said liquid at reduced pressure so as to obtain vapor and remaining liquid;
   condensing and absorbing said vapor in an absorption liquid having a lower vapor pressure than said vapor at a corresponding temperature;
   removing heat from said absorption liquid; and
   recirculating said remaining liquid to said heat exchanger.

2. The process of claim 1, wherein said condensing and absorbing steps are carried out by bringing said vapor into contact with said absorption liquid on a first, cooled surface of a second heat exchanger.

3. The process of claim 2, wherein said heat removing step is carried out by cooling said first surface of said second heat exchanger by evaporation of water from the wetted second surface of said heat exchanger by means of air flowing along said second surface.

4. The process of claim 1, wherein said liquid essentially comprises water.

5. The process of claim 1, wherein said fluid is a concentrated salt solution used as an absorption liquid.

6. The process of claim 5, wherein the absorption liquid comprises calcium chloride, lithium chloride or lithium bromide or mixtures thereof.

7. An apparatus for cooling a fluid comprising:
   first means for transferring heat from said fluid to a liquid;
   means connected to said first heat transferring means for releasing vapor by expansion from said liquid;
   means connected to said vapor releasing means for condensing said vapor; said condensing means comprising second means for transferring heat having a first cooling surface for condensing and absorbing said vapor in an absorption liquid o said first cooling surface;
   means for circulating said liquid through said vapor releasing means and said first heat transfer means; and
   means for maintaining a reduced pressure in said vapor releasing means and over said cooling surface in said condensing means.

8. The apparatus of claim 7, wherein said condensing means further comprises a second cooling surface in heat transferring contact with said first cooling surface;
   means for encasing said second heat transfer means;
   means for distributing said absorption liquid over said first surface of said second heat transfer means;
   means for introducing vapor into said casing means and contacting said vapor with said absorption liquid;
   means for removing absorption liquid diluted by condensate from said casing means; and
   means for causing air to flow in contact with said second surface of said second heat transfer means.

9. The apparatus of claim 8, further comprising means for distributing a cooling liquid over said second surface.

10. The apparatus of claim 8, further comprising means for distributing said absorption liquid substantially uniformly over said first cooling surface.

11. The apparatus of claim 9, further comprising means for distributing said cooling liquid substantially uniformly over said second cooling surface.

12. The apparatus of claim 9, wherein the cooling liquid comprises water.

13. The apparatus of claim 7, wherein the fluid is a concentrated salt solution.

14. The apparatus of claim 13, wherein the absorption liquid comprises calcium chloride, lithium chloride or lithium bromide or mixtures thereof.

15. The apparatus of claim 13 additionally comprising means for contacting said salt solution with moist air to remove moisture therefrom; and means for feeding said salt solution to said first heat transfer means.

16. The apparatus of claim 15, additionally comprising means for transferring said salt solution from said first heat transfer means to said air contacting means.

* * * * *